Dec. 26, 1961  A. MOTTU  3,014,765
COMPENSATING GUIDE MEANS
Filed Oct. 28, 1957  5 Sheets-Sheet 1
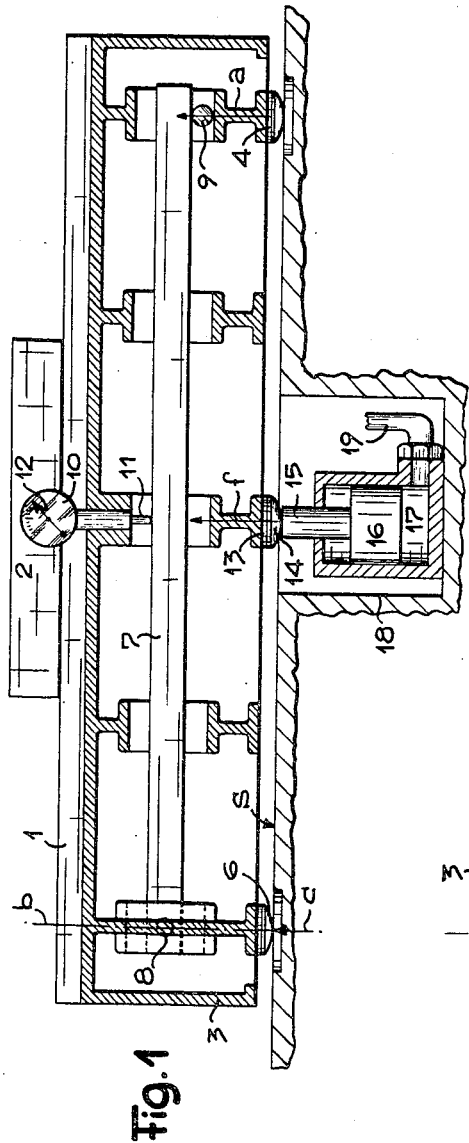
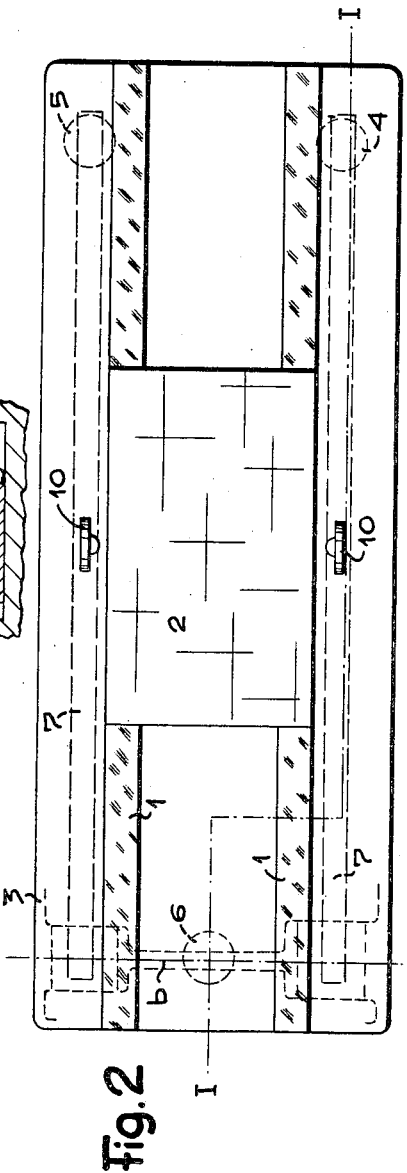
INVENTOR
ANDRÉ MOTTU
BY Irwin S. Thompson
ATTY.

Dec. 26, 1961 A. MOTTU 3,014,765
COMPENSATING GUIDE MEANS
Filed Oct. 28, 1957 5 Sheets-Sheet 2
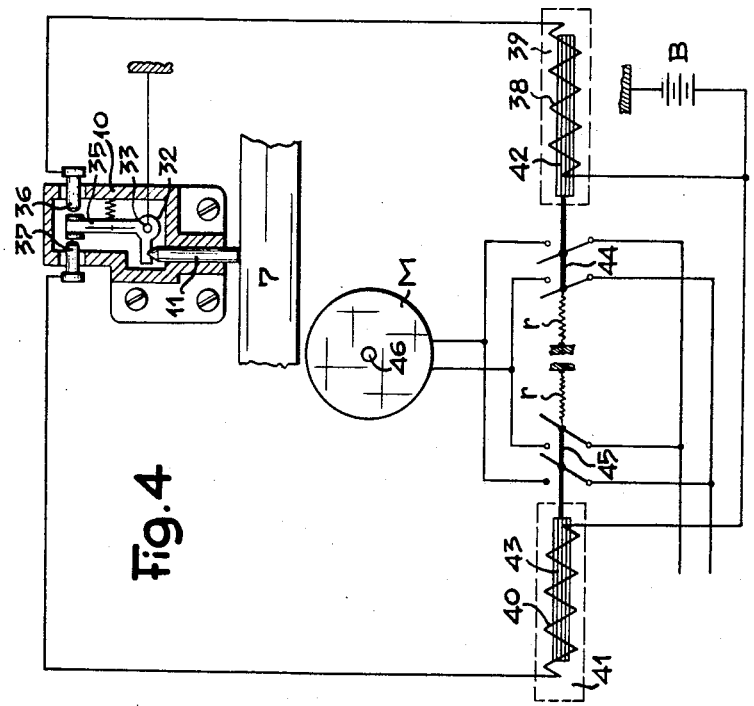
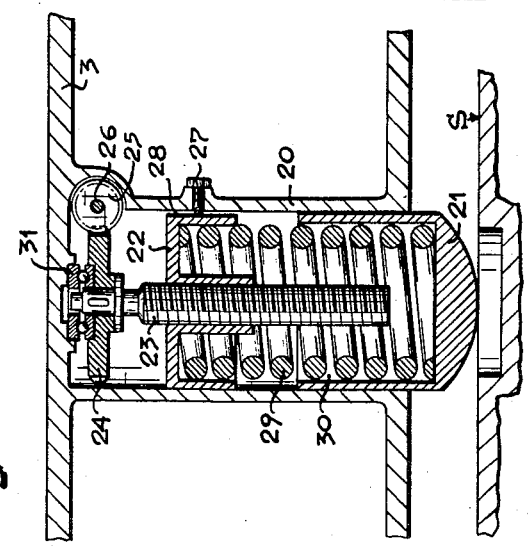
INVENTOR
ANDRÉ MOTTU
BY Irwin S. Thompson
ATTY.

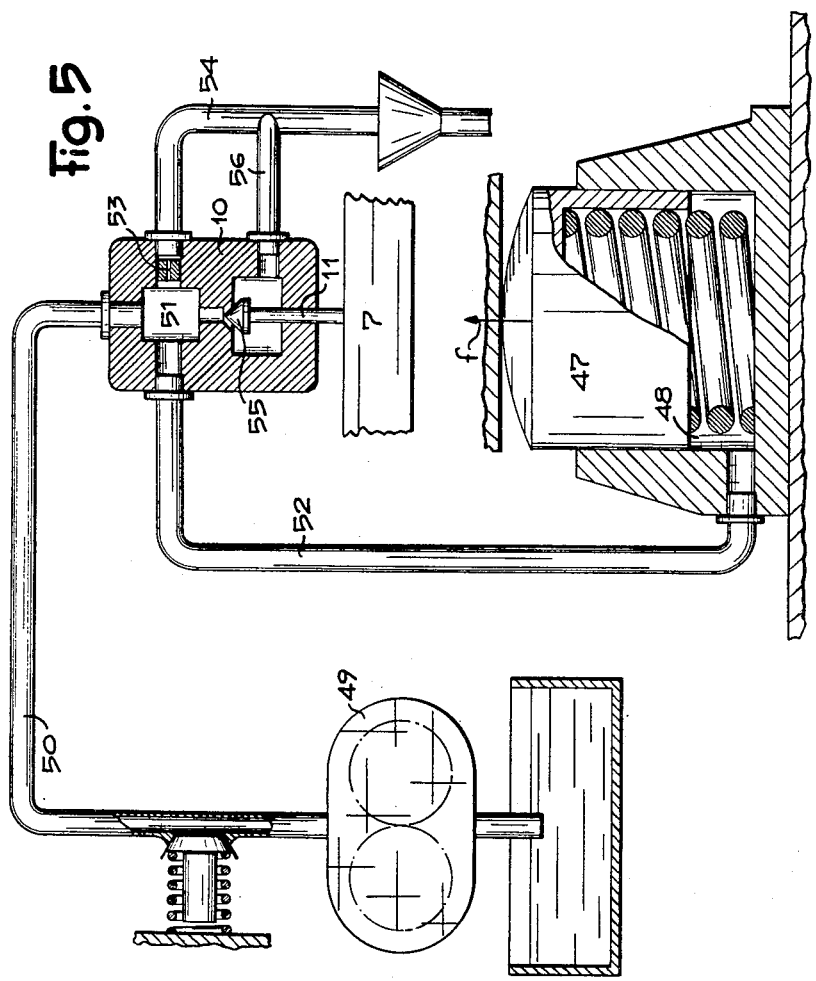
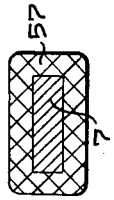

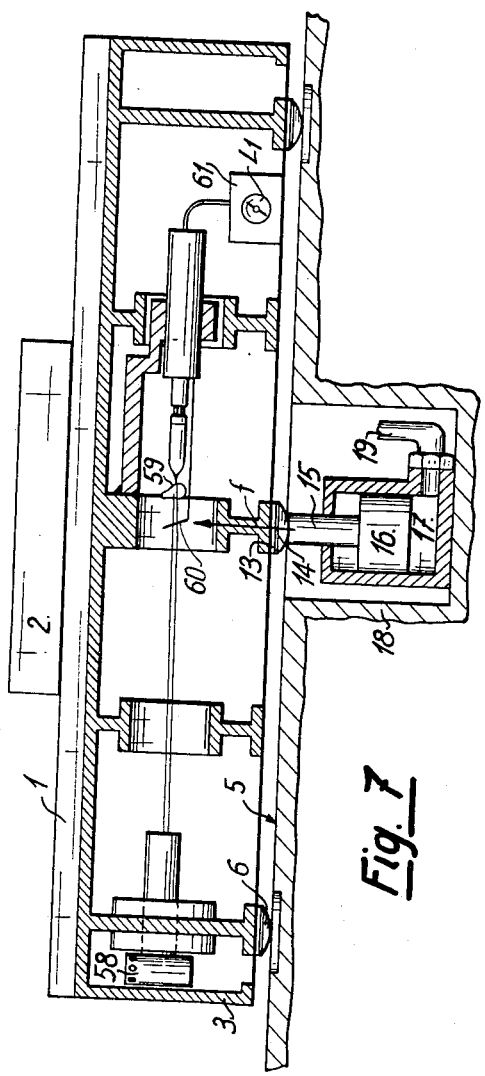

Dec. 26, 1961 A. MOTTU 3,014,765
COMPENSATING GUIDE MEANS
Filed Oct. 28, 1957 5 Sheets-Sheet 5

INVENTOR
ANDRÉ MOTTU
By Irwin S. Thompson
ATTY.

United States Patent Office 3,014,765
Patented Dec. 26, 1961

3,014,765
COMPENSATING GUIDE MEANS
Andre Mottu, Geneva, Switzerland, assignor to Societe Genevoise d'Instruments de Physique, Geneva, Switzerland, a corporation of Switzerland
Filed Oct. 28, 1957, Ser. No. 692,892
Claims priority, application Switzerland Feb. 16, 1957
12 Claims. (Cl. 308—3)

The present invention relates to a device to compensate for the static deformations of a guiding element of a machine, caused by the action of loads acting at varying positions. It applies particularly to frames or to slide rails of precision machine-tools and of measuring machines.

Present-day practice in the design of machine tools provides a guiding element of sufficiently large cross-sections, so that, under the action of a load at varying positions, constituted, for example, by a table moving along the slide-rails of a frame, the deformations of said frame remain within acceptable limits. It is also known, in the case of machine-tools of high precision or of measuring machines, to provide their frame with only three bearing points on their foundation or their support, so that the inequalities of this element do not cause strains and deformations of the frame.

In the case of large machine-tools of high precision or of large measuring machines, these present practices result in an increase in the frame cross-sections, thus often giving unacceptable consequences, such as too great overall dimensions or a too high cost price.

In the case of high precision machine-tools, such as jig boring machines or measuring machines, the greatest care is given to the machining of the slide rails, in order that when the measuring plane of the displacements and the working plane of the machine are not in a common plane, the straightness errors of these slide rails prejudice as little as possible the displacements which they permit.

A third known practice has for its purpose, on the one hand, to eliminate the machining of expensive slide rails, and, on the other hand, to eliminate the residual errors of these slide rails and is applied in the case where displacements are measured by means of an optical reading of a precision rule. This practice, known as the Eppenstein principle, recreates the image of a precision rule in the working plane.

This practice causes, in the case of machine-tools, the following drawback: The working plane being of a varying height, said working plane is not necessarily located in the same common plane as the plane in which the rule image has been reproduced and the errors are then proportional to the distance of said two planes.

A fourth known practice provides a number of bearing points greater than three between the frame and its foundation, whereby said bearing points are sufficiently near one another that the deformations of the frame remain acceptable under the action of varying loads. This solution presents the advantage of allowing a reduction of the frame cross-section, but the serious drawback is that the foundation being itself subjected to variations generally caused by temperature differences, the bearing points between the machine frame and the foundation are in varying positions at different times, and this causes an unacceptable variation of the curvature of the frame slide rails.

The device according to the invention permits a compensation for the deflection of a guiding member resting on fixed bearing points and along which moves a mobile member. Said device is characterized by the fact that it comprises at least one measuring means of the deflection of the guiding member incorporated on said guiding member, and at least one auxiliary bearing point, the push of which on the guiding member is adjustable as a relation to the indications of said measuring means in order to enable a permanent compensation of the deflection of the guiding member.

The attached drawing illustrates schematically and by way of example, four forms of construction of the compensation device which is the object of the invention.

FIG. 1 is a cross-sectional view of a first form of construction taken on line I—I of the FIG. 2.

FIG. 2 is a top view of the machine frame equipped struction of the push device.

FIG. 3 is a cross-sectional view of a modified construction of the push-device.

FIG. 4 is an electric diagram of a second form of construction.

FIG. 5 is a hydraulic diagram of a third form of construction.

FIG. 6 is a cross-sectional view of an insulated compensating bar forming a part of the invention.

FIG. 7 is a cross-sectional view of a fourth form of construction of the invention.

Figure 8:
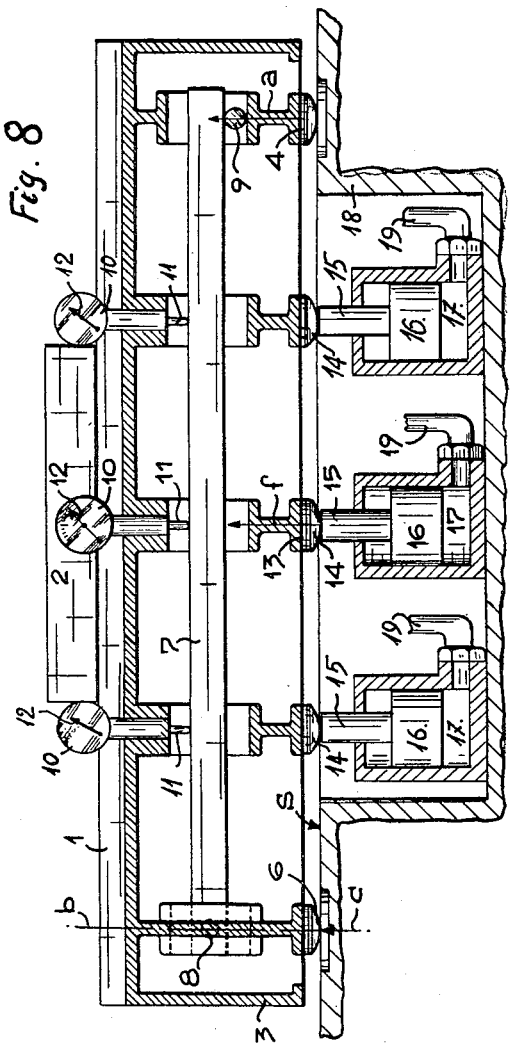
FIG. 8 is a cross-sectional view of a further modification of FIG. 1 showing several measuring instruments and a compensating device for each measuring instrument.

In the form of construction represented by FIGS. 1 and 2, two guiding members 1 are carried by a frame 3 resting on the floor S by means of three fixed points through the intermediary of three feet 4, 5, 6. A table 2 is displaceable along guides 1.

In the represented form of construction the deflection undergone by each of the guiding members 1 is compensated by an individual compensation device. Each compensation device comprises a bar 7, located in a plane parallel to the plane of the displacements of the table 2. One of the extremities of said bar 7 is hinged on an axle 8 fixed to the corresponding guiding member 1, while its other extremity rests freely on a bearing member 9. The feet 4 and 5 are disposed with respect to the bearing members 9 of the bars 7, in such a manner that the reaction forces from the floor on these feet go through the bearing points of the bars 7 on their bearing member 9. The hinge axle 8 is located in a vertical plane *b* passing through the third foot 6 of the frame and in which is exerted the reaction force *c*, exerted by the floor on said foot 6.

Each compensation device comprises a measuring member 10 carried by the frame and which presents a feeler 11 in contact with the corresponding bar 7. The feeler 11 controls the displacements of pointer 12 with respect to a graduated scale. The pointer 12 shows the deflection of the frame under the action of the weight of the table 2 moving along the guiding members 1. As a matter of fact, bars 7 resting on members 8 and 9, constitute a reference member as they do not participate in the deformations of the frame and of the displacement of guiding members 1.

Each compensation device further comprises an auxiliary foot 13 resting on an auxiliary bearing point 14, exerting a reaction force *f* on the frame, the value of which is adjustable. The auxiliary bearing point 14 comprises a push device constituted by the rod 15 of a piston 16 sliding in a cylinder 17, housed in an excavation 18 and resting on the bottom of said excavation. The cylinder 17 is fed with fluid under pressure by a duct 19 connected to a source, not represented, and which may be constituted by a pump manually actuated or actuated by means of a motor. By actuating said pump, the operator has the possibility to modify the pressure value prevailing in the cylinder 17 and consequently the value of the reaction force $f$ exerted on the auxiliary foot 13 by a hydraulic jack constituted by the rod 15 and the piston 16. Now this reaction force causes a frame deformation in the opposite sense of the deformation caused by the weight of the table 2, lain on the guiding members 1. The measuring instrument 10 indicates constantly to the operator the variations of the deflection of the guiding member with respect to the corresponding bar, so that the operator has the possibility of adjusting the pressure in the cylinder 17 in order to reduce to zero the deflection.

In the modified form of construction represented in FIG. 3, the push device of each auxiliary bearing point comprises a tubular guide 20 provided in the frame 3. A hollowed foot 21 is engaged in one of the extremities of said guide 20 and a stop 22, the position of which is adjustable, slides in said guide. This stop 22 is mounted on a control screw 23 which carries a worm wheel 24 meshing with a worm 25 carried by an actuating shaft 26. A screw 27 fixed to the guide 20 and the extremity of which is engaged in a longitudinal groove 28 of the stop 22 determines the angular position of said stop. A coil spring 29 bears on the bottom of a housing 30 provided in the foot 21 and exerts a push on the stop 22. This push is transmitted to the frame by the intermediary of the control screw 23 and of an axial stop 31.

By actuating the shaft 26, the operator may modify the value of the push exerted by the spring 29 onto the stop 22 and consequently to adjust to the desired value the compensation push exerted on the frame.

In FIG. 4, only the members necessary for the working of this form of construction are represented. The feeler 11 of the measuring instrument 10 is in contact with the bar 7 and acts on one of the arms of a lever 32 pivoted freely on an axle 33. The second arm 35 of said lever constitutes a movable contact moving between two fixed contacts 36, 37. The movable contact 35 is connected to one of the terminals of a current source B through ground. The second terminal of said current source B is connected, on the one hand, to the fixed contact 36 through the winding 38 of an electromagnet 39 and, on the other hand, to the fixed contact 37 through the winding 40 of an electromagnet 41. The movable armatures 42 and 43 of said two electromagnets are mechanically connected to the movable contacts of two switches 44 and 45 inserted in the feeding circuit of a motor M. Electromagnets 39 and 41 and corresponding respective switches 44 and 45 constitute a relay means to energize motor 46 in one direction or another direction in accordance with the position of movable contact 35. The shaft 46 of said motor is mechanically connected to an actuating shaft, not represented, such as, for example, the shaft 26 (FIG. 3), the actuating of which causes a modification of the push exerted onto the frame by one of the push devices. The two switches 44 and 45 are connected in the feeding circuit of the motor M in such a manner as to reverse the feeding of this motor, so that this motor revolves in one direction or the other according to whether switch 44 or the switch 45 is in closed position.

When the frame and consequently, the guiding member 1 corresponding to the bar 7, undergoes a deformation, the feeler 11 actuates the lever 32 in one direction or the other, according to the direction of the deformation. When this deformation of said guiding member 1 reaches a given value—which may be very small owing to the large transmission ratio of the lever 30—the movable contact 35 strikes on one of the fixed contacts 36 or 37 and closes the feeding circuit of one of the electromagnets 39 or 41 which closes one of switches 44 or 45 and the rotation in one direction or the other of the motor M. This motor actuates then the actuating shaft of the corresponding push device in order to modify the push exerted by said push device onto the frame and to cause thus a deformation of the frame in the reverse direction than the deformation which has caused the actuation of one of the electromagnets 39 or 41. When the push reaches a sufficient value in order to compensate the deformation of the frame, the movable contact 35 actuated by the feeler 11 moves away from the fixed contact 36 or 37 and interrupts the feeding of the corresponding electromagnet. A spring $r$ causes then the opening of the switch controlled by this electromagnet and the motor M stops. Thus, this device compensates automatically for the deflection of the guiding member.

In the form of execution represented by FIG. 5, the push device comprises a hydraulic jack comprising a piston 47 sliding in a cylinder 48 and the head of which exerts a reaction force $f$ on the frame 3. This cylinder 48 is fed with fluid under pressure by a fluid compressor such as a pump 49. This pump is connected by a driving back duct 50, to a chamber 51 connected by a duct 52 to the cylinder 48 and by a gauged aperture 53 to an exhaust duct 54. Besides, this chamber 51 is connected by a valve 55 controlled by the feeler 11 and a duct 56 to the exhaust duct 54.

The pump 49 being continuously operated, the cylinder 48 is fed in a permanent manner with fluid under pressure. However, a frame deformation causes a modification of the position of the valve 55 of the measuring instrument 10 and consequently a modification of its output. Consequently, the fluid pressure in the chamber 51 and thus in the cylinder 48 is a function of the deformation undergone by the frame. The larger the opening of the valve 55, the less is the pressure in the cylinder 48 and vice versa. It sets up thus an equilibrium for which the reaction force $f$ exerted onto the frame compensates the deformation undergone by the frame under the action of the weight of the table or other mobile member moving along the guides 1. The equilibrium position may be adjusted by a modification of the size of the gauged aperture 53.

FIG. 6 represents a transverse cross-section of a bar 7 provided with a thermic insulation 57 in order to render it insensitive to the quick variations of the ambient temperature which could generate modifications of its shape.

Some forms of construction of the compensation device, the object of the invention, have been described hereinabove with reference to the attached drawings, but it is clear that many modifications may be foreseen without departing from the scope of the claimed subject matter. Thus, for instance, in the first form of construction, the bars 7 are placed in parallel relationship, but in a modification, these bars could be placed in the form of a V, the vertex of this V being located in the axis of the reaction force $c$ exerted by the floor onto the foot 6. In a further modification of FIGS. 1 and 2, as represented by FIG. 8, there are illustrated several measuring instruments 10 located along one bar 7 and an auxiliary bearing point 13 provided with a push device, corresponding to each of these measuring instruments. In the case of very large frames 3, one could foresee more than three fixed bearing points.

The measuring instrument 10 could be substituted, in a modification of construction not represented, by an optical measuring device of known type, or by one or several clinometers. In a still further modification, shown in FIG. 7, the bar 7 could be substituted by a beam or rays emitted by a source 58 and falling on a photo-electric cell 59. In this case, the measuring device is constituted by a switch member 60 carried by said guiding member 1 and actuated in a periodical movement in order to intercept said beam or rays. The current variations of said photo-electric cell caused by the interruptions of said beam or rays are transformed as described in the Swiss Patent No. 280,542 and U.S. Patent No. 2,819,645 to Koulikovitch by means of an electronic apparatus 61 first in very brief impulses and then in a current of rectangular shape of which the time of flow in one direction and in the other corresponds to the time intervals between the consecutive interruptions of said beam or rays by means of said oscillating switch member 60. In this way, as described in the above-mentioned patents, the difference of the time intervals between three consecutive interruptions of said beam or rays constitutes a measure of the deflection undergone by said guiding member 1. The difference between the intervals of time is rendered visible on a reading device $L_1$ constituted by a direct current measuring instrument presenting a great mechanical or electrical inertia. It is obvious that this source of beam or rays has to be carried by the guiding member, but should be located inside said guiding member, so that the position of the beam or rays should not be prejudiced by the deformations of said guiding member. The beam or rays constitutes consequently, in the same way as the reference bar 7, a reference system with which co-operates the measuring device in order to indicate the deflection of the guiding member.

I claim:

1. In a precision machine tool or length measuring machine, comprising a frame, feet provided on said frame and bearing on a surface, guiding members on said frame, and a mobile member displaceable along said guiding members, the combination of at least one auxiliary foot for each of said guiding members, means to adjust the push exerted by each auxiliary foot on said frame, reference means disposed parallel to the displacement of said mobile member, control means responsive to the variations of the distance of each guiding member with respect to said reference means caused by the weight of said mobile member travelling along said guiding members, and a control system controlled by said control means controlling said means to adjust said push exerted by each auxiliary foot on said frame, whereby said push compensates the deflection of said guiding members.

2. A precision machine tool or length measuring machine, comprising a frame, feet provided on said frame and bearing on a surface, guiding members on said frame, and a mobile member displaceable along said guiding members, the combination of at least one auxiliary foot for each of said guiding members, means to adjust the push exerted by each auxiliary foot on said frame, reference means disposed parallel to the displacement of said mobile member and comprising a bar for each guiding member, control means responsive to the variations of the distance of each guiding member with respect to said bar caused by the weight of said mobile member travelling along said guiding members, and a control system controlled by said control means controlling said means to adjust said push exerted by each auxiliary foot on said frame, whereby said push compensates the deflection of said guiding members.

3. A machine according to claim 2 comprising further a hinge on said frame, one end of said bar being articulated with respect to said frame by means of said hinge, a bearing member on said frame, the other end of said bar resting freely on said bearing member, said hinge and said bearing member being located in vertical planes passing through said feet of said frame and perpendicular to said guiding members, whereby said hinge and bearing member are located in such a manner that said bar is unaffected by the deformations of said guiding members.

4. A machine according to claim 2 in which said control means comprises a body rigidly fastened to said frame, said body carrying a feeler resting on said bar, a switch controlled by said feeler, said control system comprises relay means actuated by said switch, a motor controlled by said relay means, and said means to adjust the push exerted by said auxiliary foot comprises actuating means mechanically connected to said motor whereby said auxiliary foot is adjusted in order to exert on said frame a push compensating the deflection of said guiding members under the weight of said mobile member.

5. A machine according to claim 2 in which said control means comprises a body fastened to said frame, said body carrying a feeler resting on said bar, valve means controlled by said feeler, said control system comprises a fluid compressor, and said means to adjust the push exerted by said auxiliary foot comprises a hydraulic jack fed by said compressor and by the intermediary of said valve means, whereby said auxiliary foot is adjusted in order to exert on said frame a push compensating the deflection of said guiding members under the weight of said mobile member.

6. In a compensating device of the deformations of a frame of a precision machine tool or a length measuring machine comprising guiding members, a mobile member displaceable along said guiding members, feet on said frame and resting on a surface, the combination of adjustable auxiliary feet for each of said guiding members, reference means disposed inside said frame and parallel to the plane of said guiding members, control means cooperating with each of said guiding members and responsive to the distance variations between said guiding members and said reference means caused by the weight of said mobile member travelling along said guiding members, and actuating means controlled by said control means connected to said adjustable auxiliary feet and controlling the strength forces exerted on said frame by said auxiliary adjustable feet in order to compensate said deformations.

7. A device according to claim 6 in which said reference means comprises a bar for each of said guiding members.

8. A device according to claim 7 comprising further a hinge on said frame, one end of said bar being articulated with respect to said frame by means of said hinge, a bearing member on said frame, the other end of said bar resting freely on said bearing member, said hinge and said bearing member being located in vertical planes passing through said feet of said frame and perpendicular to said guiding members, whereby said hinge and bearing member are located in such a manner that said bar is unaffected by the deformations of said guiding members.

9. A device according to claim 7, in which said control means comprises a body rigidly fastened to said frame, said body carrying a feeler resting on said bar, a switch controlled by said feeler, said control system comprises relay means actuated by said switch, and a motor controlled by said relay means.

10. A device according to claim 7 in which said control means comprises a body fastened to said frame, said body carrying a feeler resting on said bar, valve means controlled by said feeler, said control system comprises a fluid compressor, and said actuating means for each auxiliary foot comprises a hydraulic jack fed by said compressor and by the intermediary of said valve means, whereby said auxiliary foot is adjusted in order to exert on said frame a push compensating the deflection of said guiding members under the weight of said mobile member.

11. A machine according to claim 1, in which said reference means comprise projecting means projecting a beam of light parallel to said guiding member, a photoelectric cell for said beam of light, said beam impinging on said photoelectric cell, said control means being responsive to the variations of the distance of each guiding member with respect to said beam of light and comprising optical switch means supported by said frame and actuated in a regular periodic to and fro movement, said control system comprising relay means responsive to the time intervals between the successive interruptions of said beam of light by said optical switch, actuating means comprising a motor fed and controlled by the intermediary of said relay means, a source of supply, circuit means including said relay means and motor means connected to said source of supply, and said means to adjust the push exerted by said auxiliary foot comprising push adjusting means connected to said motor and to said auxiliary foot, whereby said auxiliary foot is adjusted in order to exert on said frame a push compensating for the deflection of said guiding member under the weight of said mobile member.

12. A device according to claim 6, in which said reference means comprise projecting means fastened to said frame parallel to said guiding members, a photoelectric cell for said beam of light, said beam impinging on said photoelectric cell, said control means comprising optical switch means supported by said guiding members and being actuated in a regular periodic to and fro movement, said control system comprising relay means responsive to the time intervals between the successive interruptions of said beam of light by said optical switch means, said actuating means comprising a motor fed and controlled by the intermediary of said relay means, a source of supply, circuit means including said relay means and motor means connected to said source of supply, push adjusting means connected to said motor and to said auxiliary foot to modify the push exerted by said auxiliary foot on the frame, whereby said auxiliary foot is adjusted in order to exert on said frame a push compensating for the deflection of said guiding member under the weight of said mobile member.

References Cited in the file of this patent

UNITED STATES PATENTS

| | | |
|---|---|---|
| 690,855 | Greene | Jan. 7, 1902 |
| 1,469,987 | Bryce | Oct. 9, 1923 |
| 1,773,570 | Bryce | Aug. 19, 1930 |
| 2,222,140 | De Iongh | Nov. 19, 1940 |
| 2,319,299 | Converse | May 18, 1943 |
| 2,685,794 | Hall | Aug. 10, 1954 |
| 2,728,221 | Klammer | Dec. 27, 1955 |
| 2,786,669 | Safford | Mar. 26, 1957 |